(12) United States Patent
Davis et al.

(10) Patent No.: US 9,399,512 B2
(45) Date of Patent: Jul. 26, 2016

(54) HYBRID SLIDING ELEMENT AND ELASTOMERIC BEARING

(71) Applicant: Bell Helicopter Textron Inc., Fort Worth, TX (US)

(72) Inventors: Hunter Davis, Arlington, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 584 days.

(21) Appl. No.: 13/875,977

(22) Filed: May 2, 2013

(65) Prior Publication Data

US 2014/0328685 A1 Nov. 6, 2014

(51) Int. Cl.
*B64C 27/35* (2006.01)
*F16C 11/08* (2006.01)
*F16C 11/06* (2006.01)

(52) U.S. Cl.
CPC ............. *B64C 27/35* (2013.01); *F16C 11/0614* (2013.01); *F16C 11/083* (2013.01)

(58) Field of Classification Search
CPC ...... B64C 27/35; B64C 27/54; B64C 27/605; F16C 11/06; F16C 11/0614; F16C 11/083; F16C 17/10; F16C 27/063; F16C 23/43
See application file for complete search history.

(56) References Cited

U.S. PATENT DOCUMENTS

| 3,261,407 | A | * | 7/1966 | Culver | B64C 27/33 416/112 |
| 5,186,686 | A | * | 2/1993 | Staples | B64C 27/35 464/69 |
| 5,902,050 | A | | 5/1999 | Balczun et al. | |
| 5,915,842 | A | | 6/1999 | Redinger | |

FOREIGN PATENT DOCUMENTS

GB 2263948 A 8/1993
WO 2005075850 A1 8/2005

OTHER PUBLICATIONS 71-3 Communication in related European Application No. 13173235.6, dated Dec. 12, 2014, 24 pages.
European Search Report in related European Application No. 13173235.6, dated Oct. 7, 2013, 4 pages.
Official Action in related European Application No. 13173235.6, dated Oct. 18, 2013, 6 pages.

* cited by examiner

*Primary Examiner* — Richard Edgar
*Assistant Examiner* — Brian P Wolcott
(74) *Attorney, Agent, or Firm* — Bell Helicopter Textron Inc.

(57) ABSTRACT

According to one embodiment, a bearing is situated in a rotor system. The bearing features a housing having a first opening therethrough, a first member disposed within the first opening and having a second opening therethrough, and an elastomeric bearing disposed within the second opening and having a third opening therethrough configured to receive a shaft. The first member having at least one substantially curved surface. A sliding element bearing disposed between the housing and the first member.

20 Claims, 4 Drawing Sheets

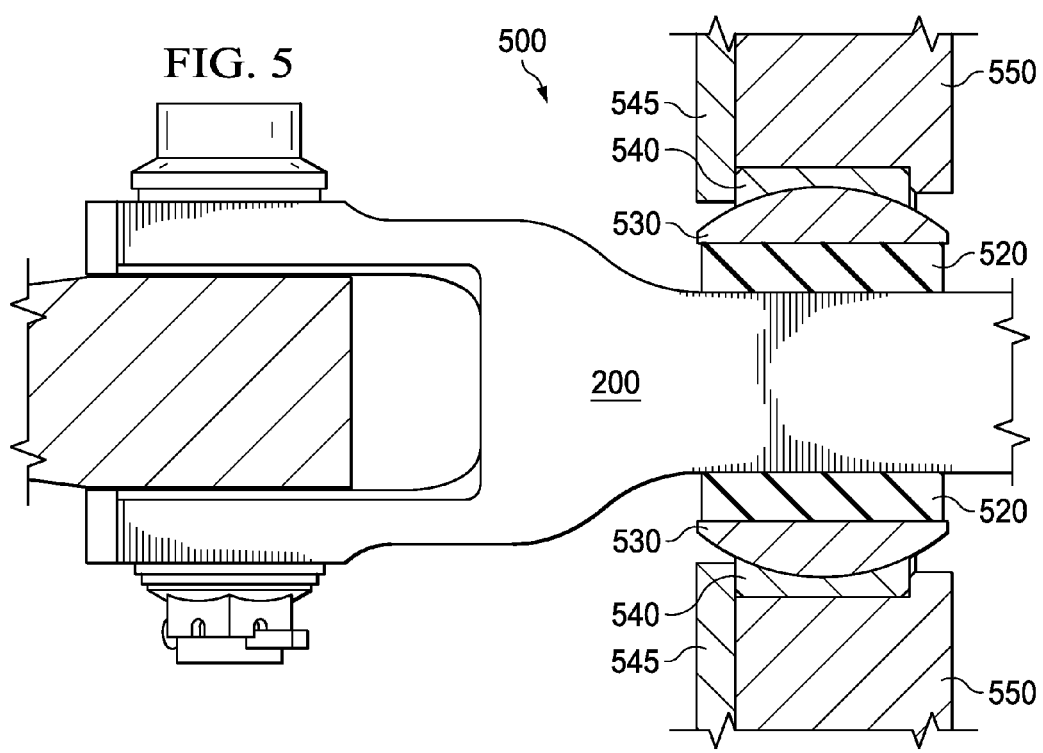

HYBRID SLIDING ELEMENT AND ELASTOMERIC BEARING

TECHNICAL FIELD

This invention relates generally to bearings, and more particularly, to a hybrid sliding element and elastomeric bearing.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include one or more pitch links to rotate, deflect, and/or adjust rotor blades.

SUMMARY

Particular embodiments of the present disclosure may provide one or more technical advantages. A technical advantage of one embodiment may include the capability to provide a bearing that protects against a variety of forces, such as torsional, axial, and cocking forces. A technical advantage of one embodiment may include the capability to the reduce the sliding surface area of a sliding element bearing. A technical advantage of one embodiment may include the capability to absorb vibrations as part of a sliding element bearing configuration.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 3-5 shows example embodiments of a bearing secured to a shaft.

DETAILED DESCRIPTION OF THE DRAWINGS

Figure 1:
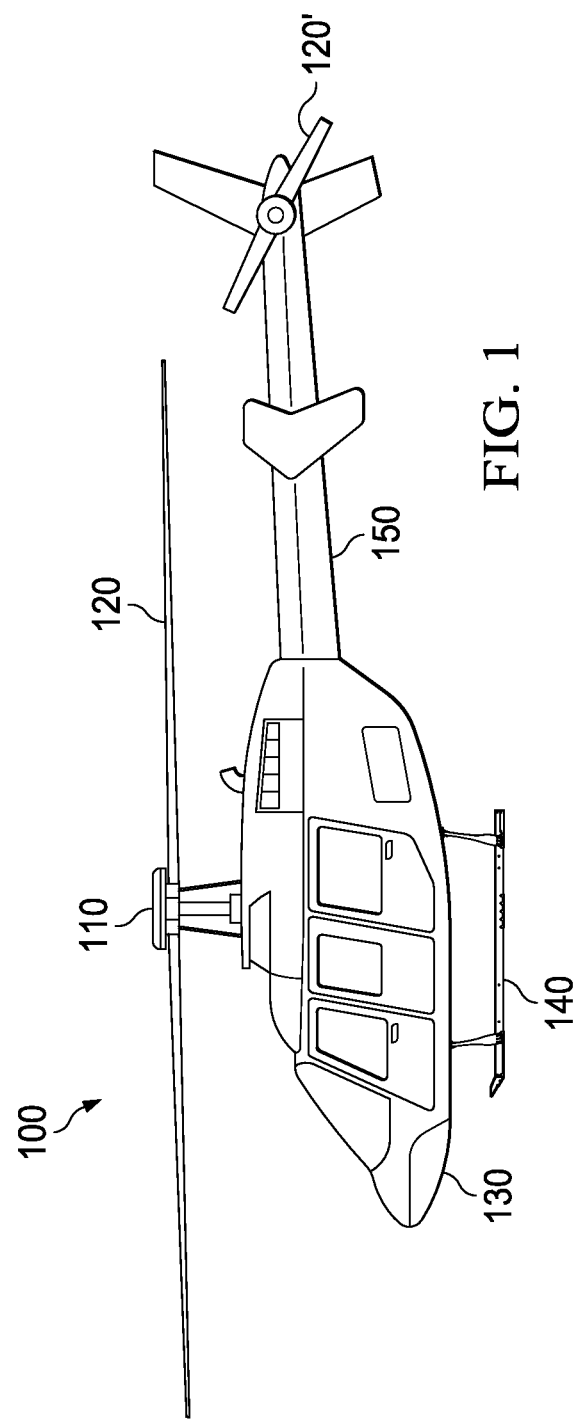
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 2:
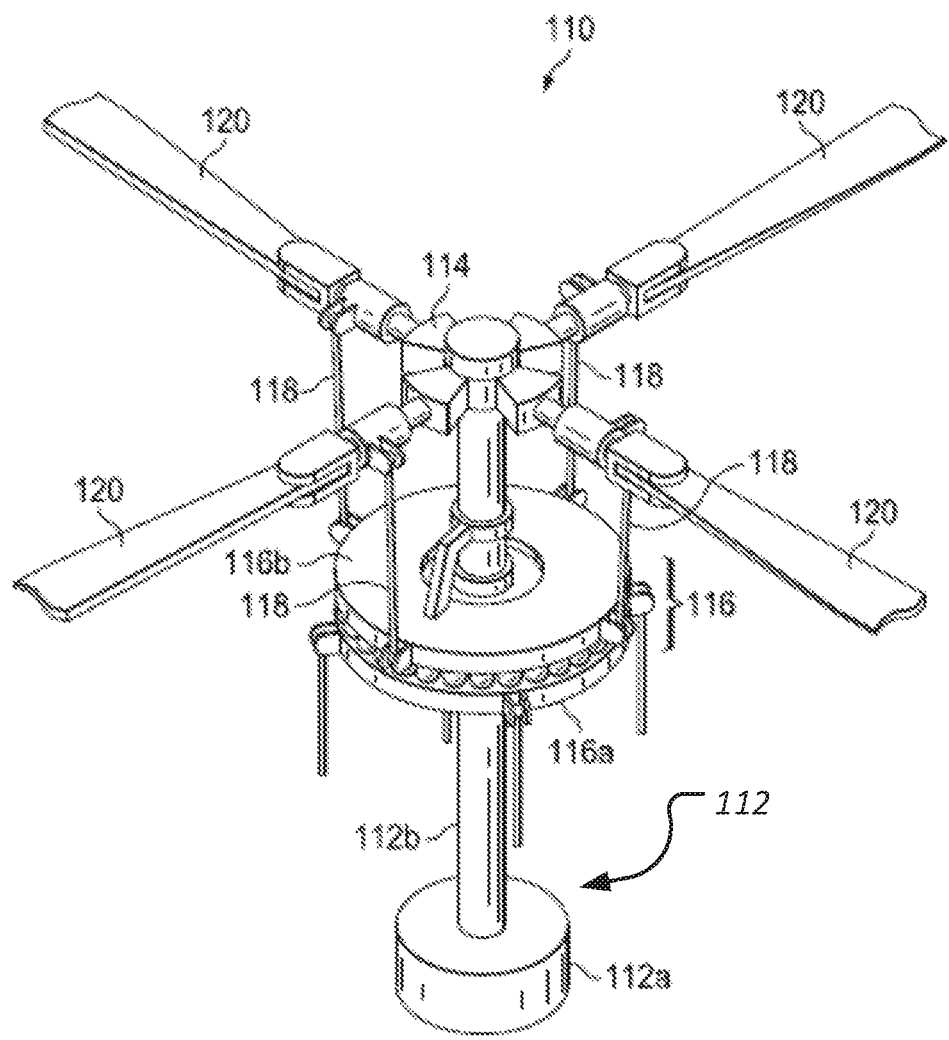
FIG. 2 shows the rotor system and blades of the rotorcraft of FIG. 1 according to one example embodiment.

FIG. 2 shows rotor system 110 and blades 120 of FIG. 1 according to one example embodiment. In the example of FIG. 2, rotor system 110 features a power train 112, a hub 114, a swashplate 116, and pitch links 118. In some examples, rotor system 110 may include more or fewer components. For example, FIG. 2 does not show components such as a gearbox, a swash plate, drive links, drive levers, and other components that may be incorporated.

Power train 112 features a power source 112a and a drive shaft 112b. Power source 112a, drive shaft 112b, and hub 114 are mechanical components for transmitting torque and/or rotation. Power train 112 may include a variety of components, including an engine, a transmission, and differentials. In operation, drive shaft 112b receives torque or rotational energy from power source 112a and rotates hub 114. Rotation of rotor hub 114 causes blades 120 to rotate about drive shaft 112b.

Swashplate 116 translates rotorcraft flight control input into motion of blades 120. Because blades 120 are typically spinning when the rotorcraft is in flight, swashplate 116 may transmit flight control input from the non-rotating fuselage to the hub 114, blades 120, and/or components coupling hub 114 to blades 120 (e.g., grips and pitch horns). References in this description to coupling between a pitch link and a hub may also include, but are not limited to, coupling between a pitch link and a blade or components coupling a hub to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112b. In the example of FIG. 2, pitch links 118 connect rotating swashplate ring 116b to blades 120.

In operation, according to one example embodiment, translating the non-rotating swashplate ring 116a along the axis of drive shaft 112b causes the pitch links 118 to move up or down. This changes the pitch angle of all blades 120 equally, increasing or decreasing the thrust of the rotor and causing the aircraft to ascend or descend. Tilting the non-rotating swashplate ring 116a causes the rotating swashplate ring 116b to tilt, moving the pitch links 118 up and down cyclically as they rotate with the drive shaft. This tilts the thrust vector of the rotor, causing rotorcraft 100 to translate horizontally following the direction the swashplate is tilted.

In the example of FIG. 2, components of rotor system 110 may be subject to a variety of forces, such as torsional, axial, and cocking forces. For example, drive shaft 112b may transfer some torsional, axial, and cocking forces towards hub 114.

Bearings may be provided to reduce component wear due to these forces. One example bearing is a sliding element bearing. A sliding element bearing may represent any material that improves sliding between two elements. As friction and/or pressure increases, however, the sliding surface area of the sliding element bearing must increase to distribute the forces appropriately. Teachings of certain embodiments recognize, however, the capability to reduce the size of the sliding element bearing by providing an elastomeric bearing to absorb some of the forces. Example embodiments are described below with regard to FIGS. 3-5.

Figure 3:
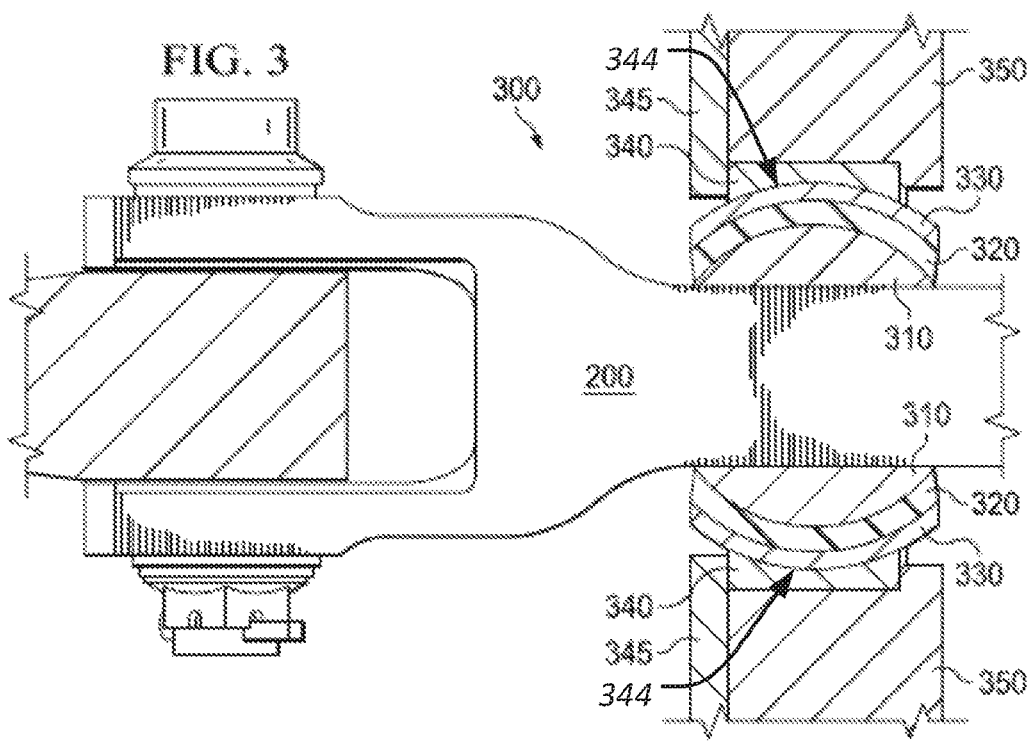

FIG. 3 shows a bearing 300 secured to a shaft 200 according to one example embodiment. Bearing 300 features an inner member 310, an elastomeric bearing 320, an outer member 330, a journal bearing 340, a clamp member 345, and a housing 350. Shaft 200 may represent any rigid device. In some embodiments, shaft 200 may represent a component of a rotorcraft, such as drive shaft 112b or a component in mechanical communication with drive shaft 112b.

In operation, according to one example embodiment, bearing 300 may receive a variety of forces, such as torsional, axial, and cocking forces, from shaft 200. In this example, elastomeric bearing 320 may accommodate smaller motions (e.g., some vibrations), and journal bearing 340 (or the sliding element bearing associated with journal bearing 340) may accommodate larger motions (e.g., rotation along the curved surface between outer member 330 and journal bearing 340). In some embodiments, elastomeric bearing 320 and journal bearing 340 may be configured such that journal bearing 340 begins carrying loads before failure of elastomeric bearing 320.

In the example of FIG. 3, housing 350 is a rigid element featuring a first opening therethrough. Housing 350 may be made of a variety of materials, such as metal or a metallic alloy. Other bearing components, such as inner member 310, elastomeric bearing 320, outer member 330, and journal bearing 340, may reside inside the first opening.

For example, housing 350 may receive journal bearing 340 in the first opening. In the example of FIG. 3, the first opening has a variable diameter across housing 350. In this example, housing 350 receives journal bearing 340 in the larger-diameter portion of the first opening, and the smaller-diameter portion of the first opening restricts movement of journal bearing 340. In the example of FIG. 3, clamp member 345 is secured to housing 350 such that clamp member 345 and the smaller-diameter portion of the first opening restrict movement of journal bearing 340. In this example embodiment, journal bearing 340 may be in direct, physical contact with both clamp member 345 and at least part of housing 350.

In the example of FIG. 3, journal bearing 340 features a substantially-curved surface. This substantially-curved surface may correspond to a substantially-curved surface of outer member 330. In one example embodiment, the substantially-curved surfaces of journal bearing 340 and outer element 330 are substantially spherical. In this example embodiment, journal bearing 340 and outer element 330 may interact relative to each other similar to a "ball joint."

In the example of FIG. 3, outer member 330 may slide within journal bearing 340. In some embodiments, a sliding element bearing 344 may be provided between journal bearing 340 and outer member 330 (as well as between and among other components of bearing 300). The sliding element bearing 344 may represent any material that improves sliding between two elements, such as sliding between journal bearing 340 and outer member 330. The sliding element bearing 344 may be comprised of any suitable material. In one example embodiment, the sliding element bearing 344 is comprised of a polytetrafluoroethylene (PTFE), a synthetic fluoropolymer of tetrafluoroethylene. The most well known brand name of PTFE is Teflon by DuPont Co. PTFE is a fluorocarbon solid, as it is a high-molecular-weight compound consisting wholly of carbon and fluorine. In another example embodiment, the sliding element bearing may be represented by a lubricant (e.g., grease) applied to cylindrical members.

In the example of FIG. 3, outer member 330 is a rigid element featuring a second opening therethrough. Outer member 330 may be made of a variety of materials, such as metal or a metallic alloy. Other bearing components, such as inner member 310 and elastomeric bearing 320, may reside inside the second opening.

For example, outer member 330 may receive elastomeric bearing 320 in the second opening. Elastomeric bearing 320 is formed from an elastomeric material. In one example embodiment, elastomeric bearing 320 features a series of elastomeric and metal shims, which allow global dithering through local small elastomeric deflections. An elastomeric material is a material, such as a polymer, having the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing). Elastomeric materials may absorb energy during compression but may also be prone failure during tension and torsion.

Elastomeric bearing 320 may feature a third opening therethrough and may be configured to receive shaft 200. In the example of FIG. 3, inner member 310 is provided between elastomeric bearing 320 and shaft 200. Inner member 310 is a rigid element featuring a fourth opening therethrough for receiving shaft 200.

In the example of FIG. 3, outer member 330 and elastomeric bearing 320 both feature substantially-curved inner and outer surfaces corresponding to the substantially-curved inner surface of journal bearing 340. In this example, inner member 310 features a substantially-curved outer surface corresponding to the substantially-curved inner surface of journal bearing 340 and features a substantially-cylindrical inner surface corresponding to the shape of shaft 200.

As explained above, the example bearing 300 of FIG. 3 features at least four openings: the first opening inside housing 350, the second opening inside outer member 330, the third opening inside elastomeric bearing 320, and the fourth opening inside inner member 310. In various embodiments, all, some, or none of these openings may be concentric. Teachings of certain embodiments recognize that providing concentric openings may improve balancing and operation of bearing 300.

Figure 4:
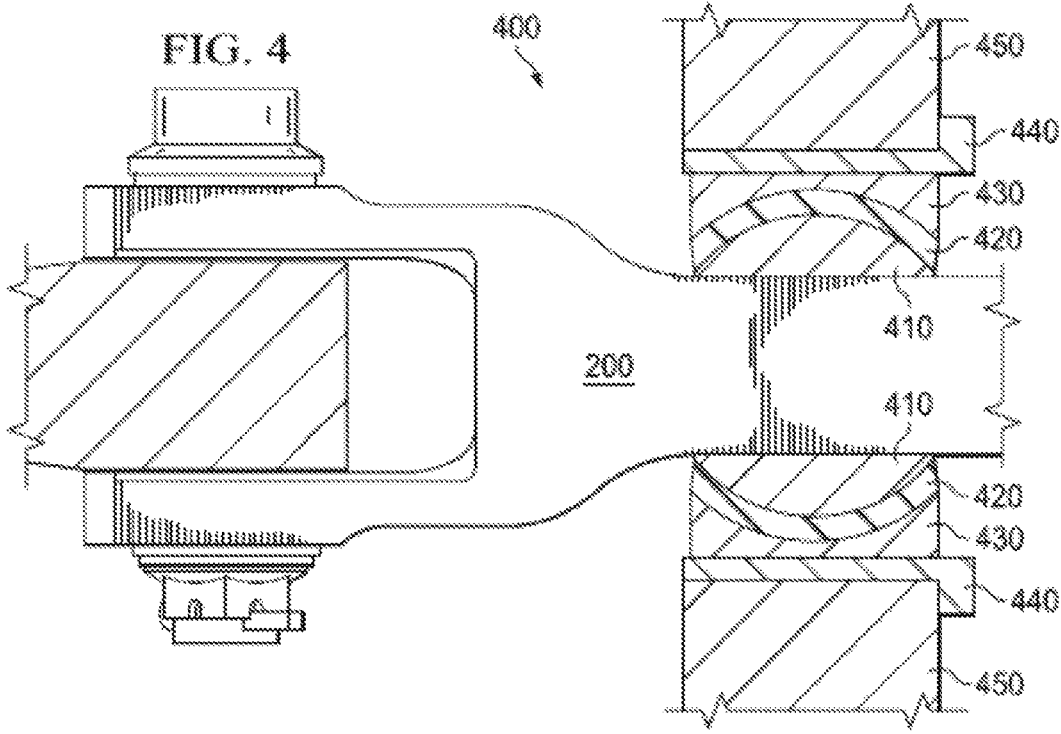

FIG. 4 shows a bearing 400 according to another example embodiment. Bearing 400 features an inner member 410, an elastomeric bearing 420, an outer member 430, a journal bearing 440, and a housing 450. These components of bearing 400 may share some similarities with the inner member 310, elastomeric bearing 320, outer member 330, journal bearing 340, and housing 350 of bearing 300.

Unlike the example of FIG. 3, outer member 430 in the example of FIG. 4 features a substantially-cylindrical outer surface facing towards housing 450, and journal bearing 440 features a substantially-cylindrical inner surface corresponding to the substantially-cylindrical outer surface of outer member 430. In this example, a sliding element bearing may be provided between outer member 430 and journal bearing 440.

FIG. 5 shows a bearing 500 according to another example embodiment. Bearing 500 features an elastomeric bearing 520, an outer member 530, a journal bearing 540, a clamp member 545, and a housing 450. These components of bearing 500 may share some similarities with the elastomeric bearing 320, outer member 330, journal bearing 340, clamp member 345, and housing 350 of bearing 300.

Unlike the example of FIG. 3, the example bearing 500 does not feature an inner element such as inner member 310. Rather, in the example of FIG. 5, elastomeric bearing 520 represents an elastomeric/shim package that features a substantially cylindrical third opening configured to receive shaft 200.

Teachings of certain embodiments recognize that each example hybrid sliding element and elastomeric bearing may configured differently based on the expected forces. For example, the example bearing 300 of FIG. 3 may be particularly well suited for high torque and/or high cocking environments. In this example, the sliding element and elastomeric bearings of bearing 300 may be capable of carrying torsional and/or cocking forces from shaft 200.

The example bearing 300 of FIG. 3, however, may have limited capability to carry axial forces from shaft 200. The example bearings 400 and 500, on the other hand, may provide greater capability to carry axial forces but less capability to carry torsional and/or cocking forces from shaft 200. In the example of FIG. 4, for example, the sliding element bearing between outer member 430 and journal bearing 440 may carry most axial forces, and the elastomeric bearing 420 may carry more torsional and/or cocking forces. In the example of FIG. 5, on the other hand, the sliding element bearing between outer member 530 and journal bearing 540 may carry most torsional and/or cocking forces, whereas elastomeric bearing 420 may carry most axial forces.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
a body;
a power train coupled to the body and comprising a power source and a drive shaft coupled to the power source;
a hub;
a rotor blade coupled to the hub;
a swashplate positioned about the drive shaft;
a pitch link coupled between the swashplate and the hub corresponding to the rotor blade; and
a bearing coupled between the hub and the drive shaft, the bearing comprising:
a housing having a first opening therethrough;
a first member disposed within the first opening and having a second opening therethrough, the first member having at least one substantially curved surface;
an elastomeric bearing disposed within the second opening and having a third opening therethrough, the drive shaft disposed at least partially through the third opening; and
a sliding element bearing disposed between the elastomeric bearing and the first member.

2. The rotorcraft of claim 1, wherein the at least one substantially curved surface is located on an outside portion of the first member facing towards the housing.

3. The rotorcraft of claim 1, wherein the at least one substantially curved surface is located on an inside portion of the first member facing towards the elastomeric bearing.

4. The rotorcraft of claim 1, further comprising a second member disposed within the third opening and having a fourth opening therethrough configured to receive the shaft.

5. The rotorcraft of claim 1, wherein the sliding element bearing is comprised of polytetrafluoroethylene.

6. The rotorcraft of claim 1, wherein the first, second, and third openings are substantially concentric.

7. A bearing, comprising:
a housing having a first opening therethrough;
a first member disposed within the first opening and having a second opening therethrough, the first member having at least one substantially curved surface;
an elastomeric bearing disposed within the second opening and having a third opening therethrough configured to receive a shaft; and
a sliding element bearing disposed between the elastomeric bearing and the first member.

8. The bearing of claim 7, wherein the at least one substantially curved surface comprises a substantially spherical portion.

9. The bearing of claim 7, wherein the at least one substantially curved surface is located on an outside portion of the first member facing towards the housing.

10. The bearing of claim 9, further comprising a journal bearing having a substantially curved surface corresponding to the at least one substantially curved surface of the first member.

11. The bearing of claim 10, wherein the sliding element bearing at least partially separates the journal bearing from the first member.

12. The bearing of claim 7, wherein the at least one substantially curved surface is located on an inside portion of the first member facing towards the elastomeric bearing.

13. The bearing of claim 12, wherein the first member further has a substantially cylindrical surface located on an outside portion of the first member facing towards the housing.

14. The bearing of claim 12, wherein the elastomeric bearing further has a substantially curved surface corresponding to the at least one substantially curved surface of the first member.

15. The bearing of claim 14, wherein the elastomeric bearing further has a second substantially curved surface facing towards the third opening.

16. The bearing of claim 14, wherein the elastomeric bearing further has a substantially cylindrical surface facing towards the third opening.

17. The bearing of claim 7, further comprising a second member disposed within the third opening and having a fourth opening therethrough configured to receive the shaft.

18. The bearing of claim 17, the second member having a substantially curved surface corresponding to the at least one substantially curved surface of the first member.

19. The bearing of claim 7, wherein the sliding element bearing is comprised of polytetrafluoroethylene.

20. The bearing of claim 7, wherein the first, second, and third openings are substantially concentric.

* * * * *